May 3, 1938.                S. T. WILLIAMS                2,116,090
                              TIRE VALVE
                          Filed Sept. 10, 1935
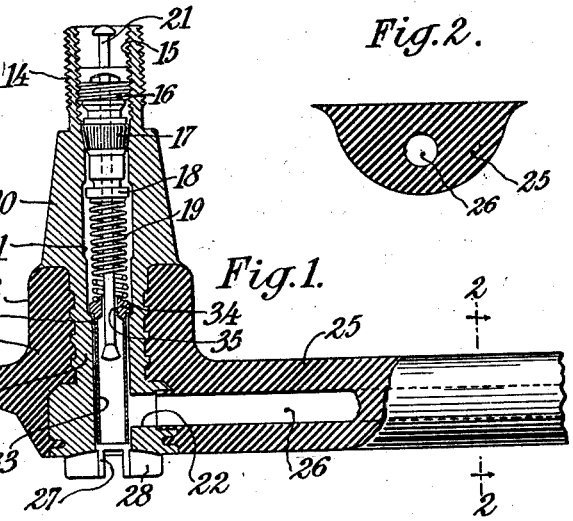
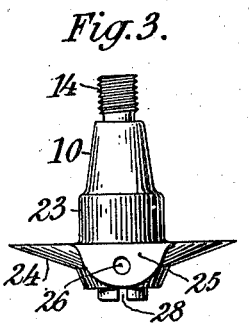
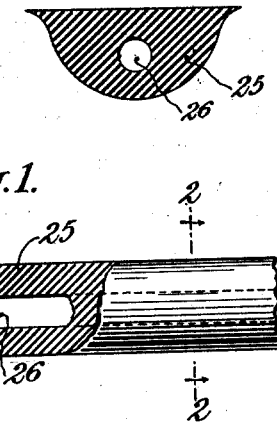
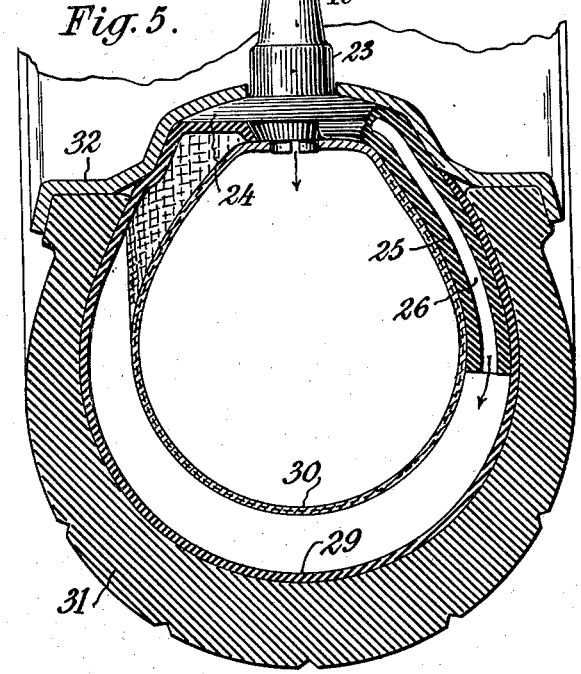
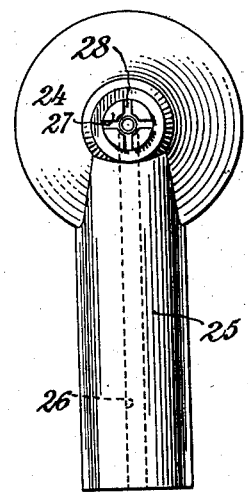
INVENTOR
Selden T. Williams,
BY
Fraser, Myers & Manley
ATTORNEYS.

Patented May 3, 1938

2,116,090

UNITED STATES PATENT OFFICE 2,116,090

TIRE VALVE

Selden T. Williams, Bellerose, N. Y., assignor to Scovill Manufacturing Company, Waterbury, Conn., a corporation of Connecticut Application September 10, 1935, Serial No. 39,881

6 Claims. (Cl. 152—12)

My present invention relates to tire valves for pneumatic tubes, and more particularly to multiple or double-chambered safety inner tubes, and aims to provide certain improvements therein.

For preventing and eliminating the dangerous and frequently fatal consequences of pneumatic tire blowouts, it has been proposed to use composite or double inner tubes so designed that when the outer tube becomes punctured or blows out there will still remain sufficient sustaining power in the inner chamber or secondary inner tube to maintain the tire casing for a limited period of time to permit the car operator to slow down and stop to make the necessary tire change or repairs. In one type of inner tube of this class, the inner tube, which in external appearance resembles a conventional inner tube, is internally provided with a fabric partition or septum which divides the tube into two chambers—an inner and an outer. Both these chambers are normally inflated to the same pressure and a pin hole or aperture at one point in the partition permits equalization of the pressure. In order that the partition will not be subjected to abnormal pressure on inflation, a special tire valve is used which has a pin hole aperture somewhat smaller than the aperture in the partition. The partition type of tube above described, when normally inflated, functions as an ordinary inner tube, and as both chambers are under the same pressure the partition hangs loosely within the tube. Should a blowout occur in the casing or a puncture cause a fast leak in the outer chamber, the air therefrom is suddenly released, whereupon the air in the inner chamber presses the partition outwardly against the rent or puncture in the casing and to a limited extent serves as a blowout patch. Although the tire pressure within the inner chamber is thus reduced, there is nevertheless adequate sustaining pressure left therein to permit the slowing down of the car to a safe speed and final stop. Of course the air under pressure in the inner chamber slowly leaks out through the pin hole in the partition, but the time required to do so is nevertheless sufficiently long to enable the driver to bring his car under complete control from high speed.

The type of inner tube above described possesses certain objections and handicaps from both the manufacturing and motorist's standpoints, because (1) the time required to inflate and deflate the tube in the mould during curing is much longer than with conventional inner tubes, thus increasing the manufacturing costs; and (2) inflation and deflation when mounting or dismounting the tires also take a much longer time than with conventional inner tubes.

According to my present invention I overcome the objectionable features inherent in dual chambered inner tubes by providing an inner tube wherein the chambers are circumferentially substantially concentrically disposed and are adapted to be simultaneously inflated through a valve stem having ducts or passages leading directly to the respective chambers and having means for metering the flow of fluid into the respective chambers when required. A particular feature of my improved tire valve stem resides in providing such stem with ducts or passages leading directly to the respective chambers of the tube and through which the tube may be rapidly inflated and deflated during the curing thereof, and the provision of a special metering plug adapted to engage in one of the passages for restricting the normal flow of fluid between the chambers during and after inflation when the tube is mounted within a tire. The invention also contemplates the provision of a special form of valve stem adapted to have two substantially concentrically disposed tubes or chambers directly connected to the stem and adapted for simultaneous inflation. The invention will be better understood from the detailed description which follows when considered in conjunction with the accompanying drawing showing a preferred embodiment of my invention, and wherein Figure 1 is a longitudinal section, partly in elevation, showing a tire valve stem embodying my invention.

Fig. 2 is a section taken along the plane of the line 2—2 of Fig. 1.

Fig. 3 is an elevation of the valve stem shown in Fig. 1 when viewed from the right end thereof.

Fig. 4 is a bottom plan view of the valve stem shown in Figs. 1 and 3.

Fig. 5 is a radial section showing an application of the valve stem of my invention to a safety inner tube disposed within a tire casing mounted upon a rim.

Referring to the drawing, the valve stem of my invention may be said to consist of a metallic body portion 10 having an axial bore 11 therethrough of different diameters and an enlarged rubber-headed portion 12 fixed to the body portion adjacent one end thereof.

The body portion, which is preferably formed of brass or other suitable metal, may be of any desired contour, and as herein shown has a portion 13 intermediate its ends of reduced diameter and externally formed with annular grooves or ribs for promoting the holding engagement of the rubber head 12 onto the metallic body. Above the rubber-headed portion the outer wall of the body portion is of frusto-conical shape and terminates at its upper or outer end in a screw-threaded nipple portion 14. The axial bore 11 at its outer end is internally threaded, as indicated at 15, to accommodate and hold a suitable removable valve core 16 which may be of any approved type consisting of a valve plug and seat member 17, a valve check 18, a valve closing spring 19 and a valve spring support 20, all non-removably assembled upon a valve pin 21. The body member 10 below the valve core therein, and preferably within the compass of the enlarged rubber head 12, is formed with a lateral duct or bore 22 leading from and communicating with the bore 11.

The rubber head 12 comprises a substantially cylindrical portion 23 surrounding the reduced portion 13 of the body, a somewhat conical or tapered disk-like portion 24 and a lateral tubular portion 25, the top of which is preferably flat and disposed in a common plane with the top of the disk-like portion 24. The bore 26 within the tubular portion 25 is in alignment and in communication with the lateral duct 22 in the body member 10. Preferably the body portion has an axial extension 27 extending beyond the rubber head 12, and said extension may be provided with radial slots 28.

The valve stem above described may be directly connected to a pair of substantially concentric inner tube members 29 and 30, the tube 29 being of normal character and formed of elastic extensible material, while the tube 30 is preferably substantially inextensible and formed of rubberized fabric. The valve stem may be directly connected to the tubes 29 and 30 in any preferred manner, but in view of the substantially conical disk-like rubber head 24 and the axial projection 27, the valve stem may be directly connected to said respective tubes from the exteriors thereof, whereupon said tubes can be moulded directly onto the valve stem. The tubes when connected to the valve stem and mounted within a tire casing 31 upon a tire rim 32, will assume the relative positions of the respective parts shown in Fig. 5 when the inner tube chambers are inflated. In said figure it will be seen that the lateral extension 25 of the rubber head on the valve stem is radially disposed between the walls of the inner and outer tube elements 30 and 29 to facilitate direct inflation of the outer tube element 29, but it will be appreciated that said lateral extension may assume any other relationship between the two tube elements.

In a double-chambered inner tube of the type illustrated in Fig. 5, in order to secure the benefits and advantages of the sustaining power of the inner tube should the outer tube become punctured or blow out, it is apparent that the rate of flow of air between the tubes should be restricted. It is also desirable that such restriction should not be effective during the curing of the tube so as not to impede or hamper the inflation or deflation of the tubes. To accomplish these desirable ends I have provided a novel metering means, which, as herein shown, consists of a special form of valve spring support 20.

As will be seen from an inspection of Fig. 1, the valve spring support 20 is in the form of a hollow tubular member 33 of sligthly smaller diameter than the drilling through or portion of the bore 11 which communicates with the duct 22 so as to provide but limited clearance between said tubular portion and said bore. At its top the spring support is formed with an enlarged head 34 which seats against a shoulder within the bore 11, said head having a central opening 35 of but slightly larger diameter than the valve pin 21. A proper metering of the air passing through the valve is thus secured by proportioning the clearance between the pin 21 and the opening 35, and between the exterior of the tubular portion 33 and the surrounding wall of the bore 11. It will thus be seen that the rate of air flow through the opening 35 will be such as to provide substantially simultaneous equalization of the pressure in the inner tube elements 29 and 30.

During the curing of the tubes 29 and 30 and the moulding thereof onto the valve stem, the valve core 16 is withdrawn from the valve stem and such curing operation carried on either without any valve core at all or with a core which does not obstruct or restrict the passages in the valve stem, so that rapid inflation and deflation may take place. It will also be apparent that initial pressure may be built up in the tube chambers after mounting upon the wheel, either without the use of a valve core or with a core which will not restrict the flow of fluid through the stem, after which a metering core such as disclosed in Fig. 1, may be inserted into the stem and the final inflation carried on therethrough. It will also be obvious that should it be desired to rapidly deflate both chambers of the inner tube, the special valve core 16 may be removed. It will also be apparent that the inner tube when mounted within a tire and inflated, will have open but restricted communication between the tube chambers, so that upon a blowout occurring in the outer chamber 29, the loss of air from chamber 30 will not be instantaneous, but on the contrary slow enough to afford limited sustaining power for the casing to afford the car operator time to slow down and bring the car to a stop before severe damage is done to either the casing or the inner tube.

The valve stem construction hereinbefore described, it will be appreciated, is susceptible of change in form and disposition or arrangement of the lateral ducts leading from the main bore; and also in the manner in which the stem may be attached to the inner tube. Hence I do not wish to be limited to the specific form of the invention disclosed, since the same may be varied without departing from the spirit of the invention as defined in the claims.

What I claim is:

1. A tire valve stem having a check valve therein and a plurality of ducts below the check valve, and means for simultaneously metering the flow of fluid through said ducts which may pass said check valve when open.

2. A tire valve stem having a removable valve core therein and a plurality of ducts below the valve core, said valve core comprising a part for simultaneously metering the flow of fluid through said ducts which may pass the valve of said valve core when open.

3. A tire valve stem having a bore therethrough and a duct leading from said bore, a valve core in said bore above the duct, and a removable plug in the bore below the valve core for simultaneously metering the flow of fluid through said bore and said duct.

4. A tire valve stem having a bore therethrough and a lateral duct leading from said bore, a valve core in said bore above the duct, and a removable hollow plug in the bore below the valve core for metering the flow of fluid through said bore and said duct, said plug having a restricted opening in one end thereof and being of a diameter slightly smaller than the bore within which it extends and of a length to overlie the duct.

5. A tire valve stem having a bore therethrough and a lateral duct leading from said bore and a valve core in said bore above the duct comprising a valve spring support having a tubular portion of somewhat smaller diameter than the portion of the valve stem bore into which it extends and of a length to overlie the duct for metering the flow of fluid through said bore and said duct.

6. A tire valve stem for a pneumatic tube having two circumferentially disposed chambers which are adapted to be simultaneously inflated, said valve stem having communicating ducts for leading to the respective chambers, and selective removable means for either inflating directly through the unrestricted communicating ducts or for restricting the cross-sectional area of the communicating ducts for metering the flow of fluid through said ducts.

SELDEN T. WILLIAMS.